United States Patent [19]
Rossi et al.

[11] Patent Number: 5,828,347
[45] Date of Patent: Oct. 27, 1998

[54] UNIVERSAL COMMUNICATIONS SYSTEM FOR SPACE APPLICATIONS

[75] Inventors: David A. Rossi, Washington, D.C.; Clark Thompson, Webster; John M. Lounge, Seabrook, both of Tex.

[73] Assignee: Spacehab Inc., Vienna, Va.

[21] Appl. No.: 666,729

[22] Filed: Jun. 18, 1996

[51] Int. Cl.[6] .............................. H01Q 3/02; H01Q 15/20
[52] U.S. Cl. .................... 343/882; 343/915; 343/DIG. 2; 244/158 R
[58] Field of Search ....................................... 343/878, 881, 343/882, 890, 906, 915, 916, DIG. 2; 403/57, 58; 244/158 R, 122, 122 F

[56] References Cited

U.S. PATENT DOCUMENTS

| | | | |
|---|---|---|---|
| 3,304,037 | 2/1967 | Candela | 343/882 |
| 4,185,288 | 1/1980 | Dosch et al. | 343/882 |
| 4,518,137 | 5/1985 | Andrews | 244/113 |
| 4,550,319 | 10/1985 | Ganssle et al. | 343/DIG. 2 |
| 4,562,441 | 12/1985 | Beretta et al. | 343/DIG. 2 |
| 4,677,444 | 6/1987 | Perek | 343/915 |
| 4,711,417 | 12/1987 | Steffy et al. | . |
| 4,867,395 | 9/1989 | Taylor et al. | 244/158 R |
| 4,943,014 | 7/1990 | Harwoods et al. | 244/158 R |
| 4,964,596 | 10/1990 | Ganssle et al. | 244/158 R |
| 5,184,145 | 2/1993 | Devillers et al. | 343/916 |
| 5,212,493 | 5/1993 | Cluniat et al. | 343/882 |
| 5,257,034 | 10/1993 | Turner et al. | 343/915 |
| 5,314,146 | 5/1994 | Chicoine et al. | 244/158 R |
| 5,326,049 | 7/1994 | Rom et al. | 343/DIG. 2 |
| 5,419,521 | 5/1995 | Matthews | 343/882 |
| 5,566,909 | 10/1996 | Lapins | 244/158 R |

*Primary Examiner*—Michael J. Tokar
*Assistant Examiner*—Tan Ho
*Attorney, Agent, or Firm*—Rossi & Associates

[57] ABSTRACT

A universal communication system enables dedicated and independent communications capability to NSTS payload elements and ground based communications networks. The system may either utilize existing communications satellites as an intermediate network to provide continuous communications with payload elements, regardless of orientation or configuration of the NSTS Orbiter, or may communicate directly with ground stations via down link capability. In addition, the universal communications system can provide supplemental and independent communications capacity to the NSTS Orbiter's primary communication system.

3 Claims, 5 Drawing Sheets

UNIVERSAL COMMUNICATIONS SYSTEM FOR SPACE APPLICATIONS

FIELD OF THE INVENTION

The invention relates in general to communication systems for providing communication between two space vehicles in Earth orbit and between space vehicles and ground stations. More specifically, the invention relates to a communications system integral to a National Space Transportation System (NSTS) Orbiter payload module which provides dedicated and independent communications between payload elements, systems and experiments within the module and ground based communications networks.

BACKGROUND

There has been a movement in recent years to privatize access to space and space transportation systems and develop commercial space systems. In this regard, various privately owned commercial systems have been proposed for implementation with the NSTS Orbiter. Most recently, the National Aeronautics and Space Administration has also decided to relinquish control of NSTS operations to a coalition of private companies called the United Space Alliance.

One such successful implementation of a commercial space venture was the successful development of the SPACEHAB module by SPACEHAB Inc. The SPACEHAB module, as described in U.S. Pat. No. 4,867,395, the contents of which are incorporated herein by reference, includes flat end caps and a flat top panel that permit useful payload items to be attached to the outside of the module in addition to being carried within; the module. The SPACEHAB module can be readily co-manifested with other payloads within the cargo bay of the NSTS, Orbiter and has been successfully flown on several missions. In order to increase the pressurized volume of the basic SPACEHAB module, it has been recently proposed to couple one or more of the basic modules together to form a variable length mission-configurable module, as described in co-pending and commonly assigned U.S. patent application Ser. No. 08/401,353, to carry cargo required to facilities in highly inclined orbits such as the Mir space station or the planned International Space Station Alpha.

One current drawback to offering commercial access to space via privately owned and operated modules within the cargo bay of the NSTS Orbiter, is the inability of commercial customers to maintain constant direct communicate with payload elements and/or their own mission specialists working within the module, due to the inherent limitations of communicating through the NSTS Orbiter primary communications system. It is therefore an object of the invention to provide a universal communication system that will provide dedicated and independent communications capability to NSTS payload elements.

SUMMARY OF THE INVENTION

The present invention provides a universal communications system that enables dedicated and independent communications capability to NSTS payload elements and ground based communications networks. The system may either utilize existing communications satellites as an intermediate network to provide continuous communications with payload elements, regardless of orientation or configuration of the NSTS Orbiter, or may communicate directly with ground stations via down link capability. In addition, the universal communications system can provide supplemental and independent communications capacity to the NSTS Orbiter's primary communication system.

The universal communications system includes an antenna system capable of providing a greater field of view for antenna target acquisition than is currently available, thereby enhancing communications uplink and downlink capacity for payload elements. Greater field of view for antenna target acquisition is accomplished by an antenna installation integral to an NSTS payload module which will utilize the system. The antenna system includes an antenna boom that can be articulated and rotated, thereby facilitating in-flight re-orientation of the antenna to facilitate direct line-of-sight communication signals between terrestrial or other orbiting receiving and transmitting antennas. Preferably mounted to a flat top of a payload module structure, the articulating boom structure is configured to accommodate NSTS Orbiter size restrictions. The antenna boom structure is mounted to an upper surface of the payload by an attachment mechanism capable of articulating the boom structure through a 180 degree arc and rotating the boom structure in a 360 degree circle. Antenna mounting is configured to facilitate efficient use of NSTS Orbiter bay volume by utilizing articulating feature for optimum orientation for various operations including launch and landing. A larger antenna by therefore be utilized due to the efficient use of bay volume via the use of the articulating boom structure. The boom structure also preferably includes a jettison feature to jettison that portion of the antenna system that remains beyond NSTS launch and landing envelopes in the case of an emergency. The jettisonable portion is configured such that is center of mass falls on the axis of the boom structure, and the jettison mechanism acts such that separation forces are oriented along an axis which promote the jettisoned portion to depart the NSTS Orbiter without tumbling, thereby reducing the risk of impacting the vehicle.

BRIEF DESCRIPTION OF THE DRAWINGS

The invention will be described with reference to the accompanying drawings, wherein.

DETAILED DESCRIPTION OF THE PREFERRED EMBODIMENTS

Figure 6:
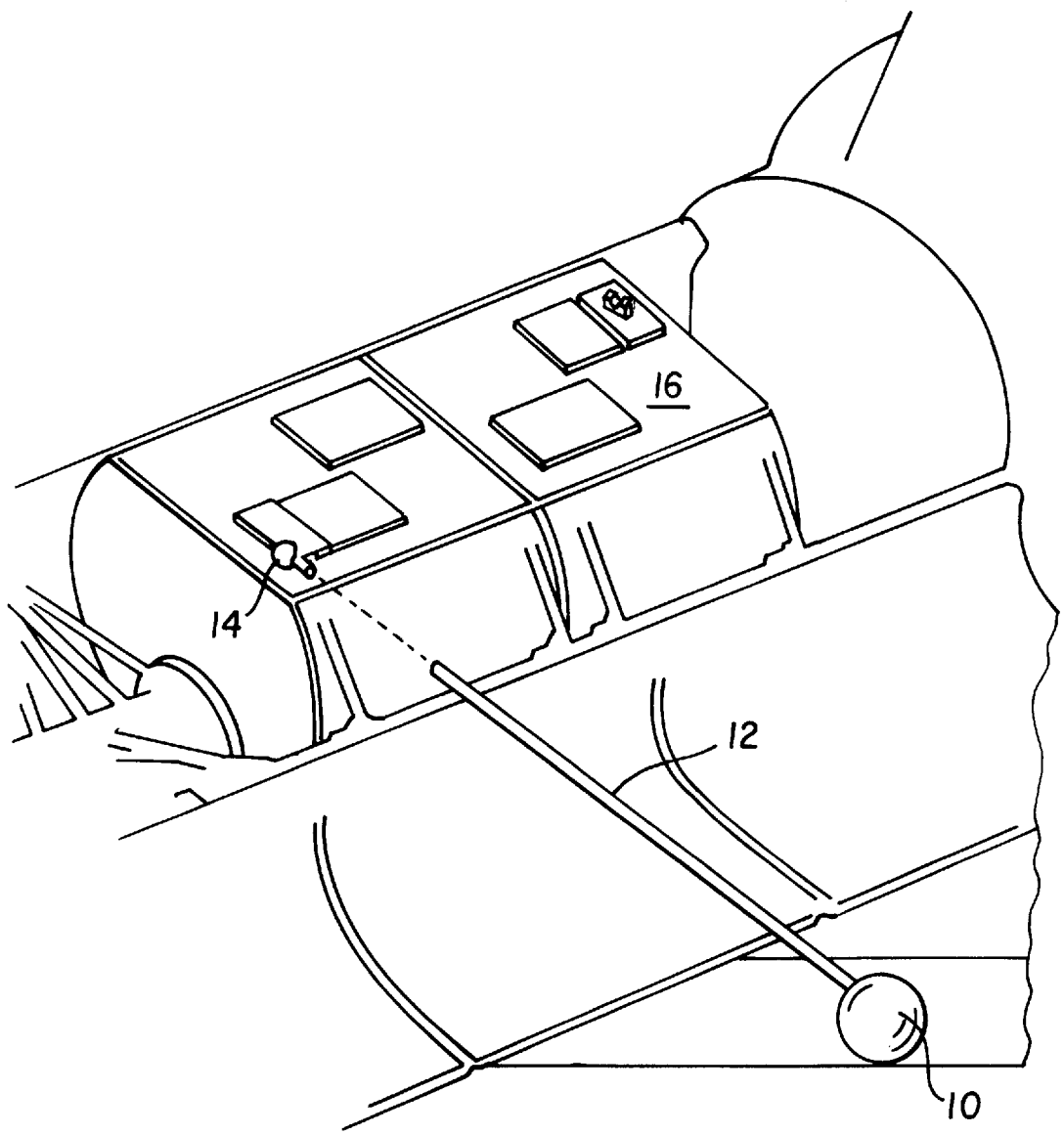
FIG. 6 illustrates the antenna and boom assembly being jettisoned.

FIGS. 1–4 respectively illustrate isometric, side, top and front views of the communication system in accordance with the invention in both a stowed position and an extended position shown in phantom. The communication system includes an antenna structure 10 (for example a phased array antenna) rotatably coupled to a first end of a boom structure 12 and a universal mounting assembly 14 coupled to the second end of the boom structure 12 and to a payload module 16. In the preferred implementation of the invention, the payload module 16 is a SPACEHAB dual module incorporating a flat top design, which enables the antenna structure 10 to be properly stowed within the closed bay configuration indicated by the hatched line illustrated in FIG. 4. The boom structure 12 is also preferably mounted to the universal mounting assembly 14 via explosive bolts or any other automatic decoupling mechanism 15, thereby permitting the boom structure 12 to be jettisoned (as illustrated in FIG. 6) in emergency situations where the antenna structure 10 and boom structure 12 cannot be properly stowed.

Figure 1:
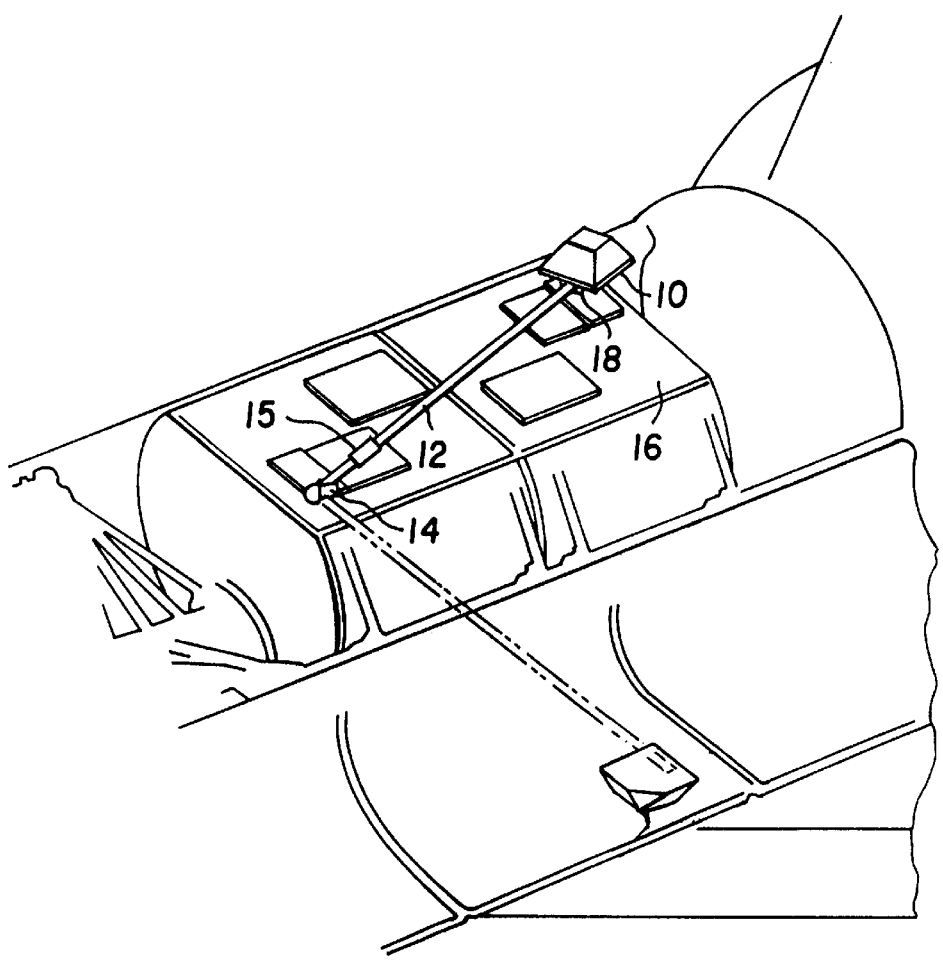
FIG. 1 is an isometric view of a communication system in accordance with the invention in a stowed position mounted atop a flat topped pressurized payload installed in the cargo bay of an NSTS Orbiter.
Figure 2:
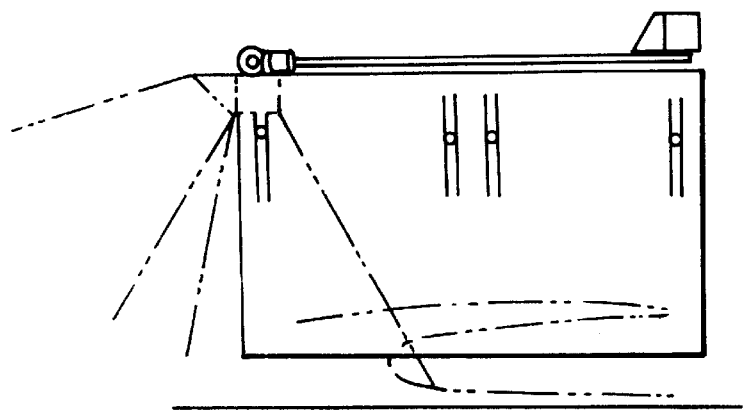
FIG. 2 is a side view of a communication system in accordance with the invention in a stowed position mounted atop a flat topped pressurized payload installed in the cargo bay of an NSTS Orbiter.
Figure 3:
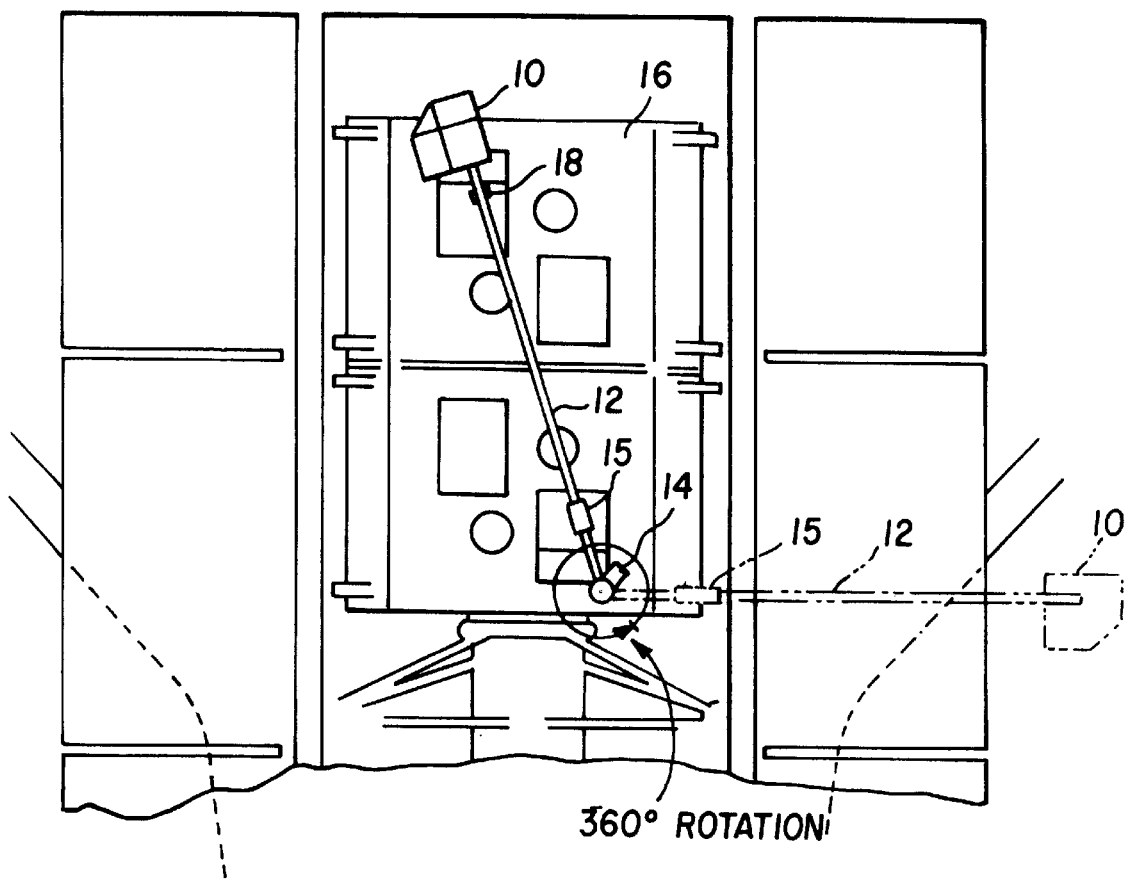
FIG. 3 is a front view of a communication system in accordance with the invention in a stowed position mounted atop a flat topped pressurized payload installed in the cargo bay of an NSTS Orbiter.
Figure 4:
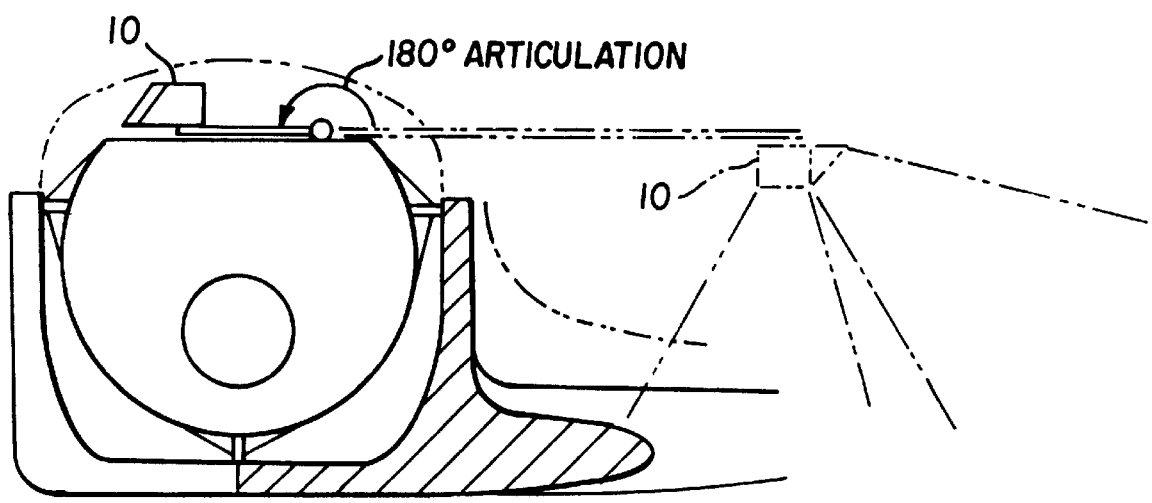
FIG. 4 is a front view of a communication system in accordance with the invention in a stowed position mounted atop a flat topped pressurized payload installed in the cargo bay of an NSTS Orbiter.
Figure 5:
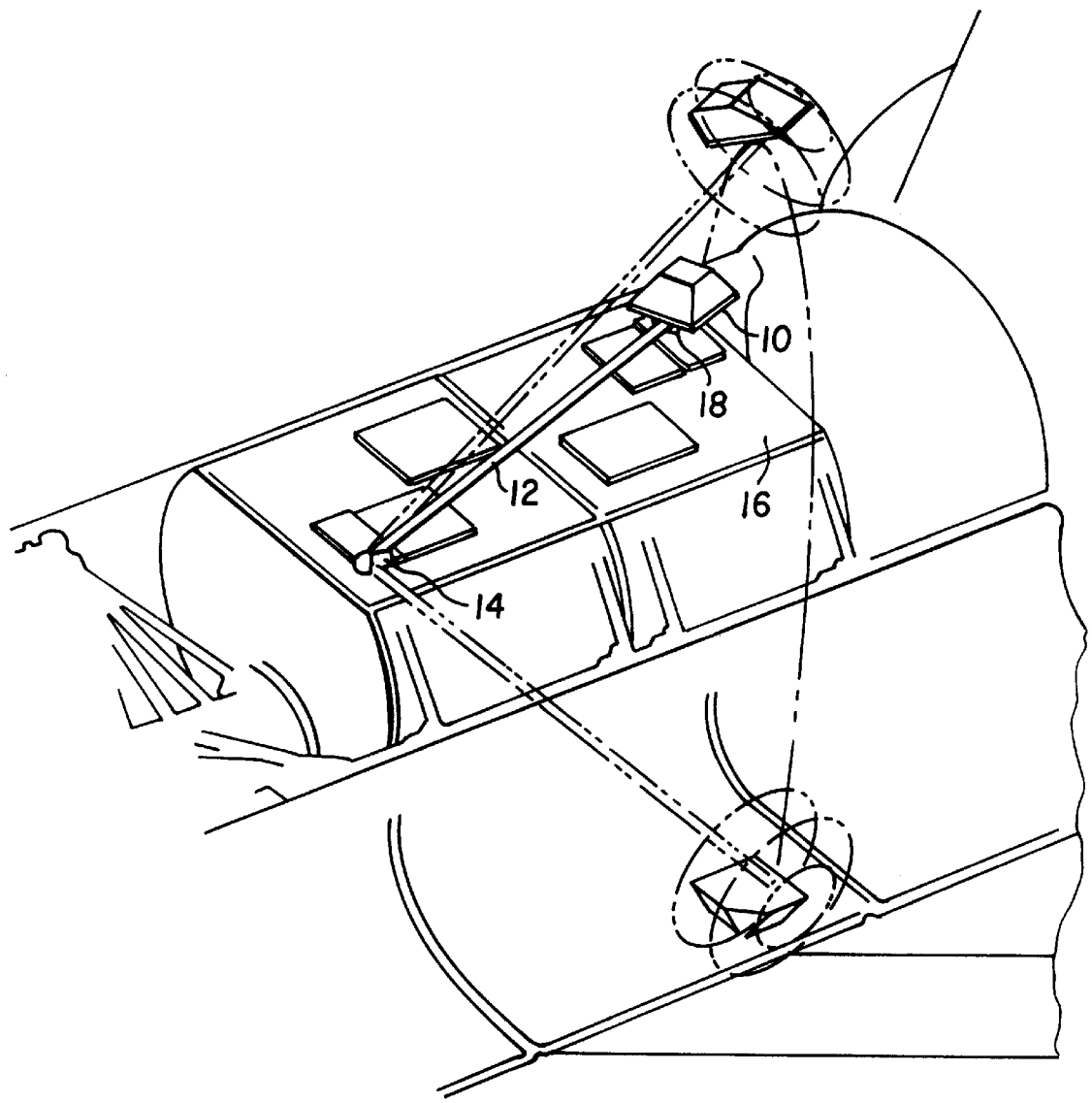
FIG. 5 is an isometric view illustrating the ability to rotate the antenna about the long axis of the boom.

The universal mounting assembly 14 includes electrical motors and gear assemblies that permit substantially 360 degrees of rotation of the boom structure 12 in a plane substantially parallel to the flat top of the payload 16 as viewed in FIG. 3, and substantially 180 degrees of articulated motion of the boom structure 12 as viewed in FIG. 4. Accordingly, the boom structure 12 is fully rotatable and articulatable to allow the antenna structure 10 to be located in any desired position above the cargo bay of the NSTS Orbiter. In addition, the antenna structure 10 is coupled to the boom structure 12 by a rotating and articulating mounting 18 that permits the antenna structure 10 to be rotated substantially 360 degrees about the axis of the boom structure as illustrated in FIG. 5 and to articulated substantially 180 degrees as illustrated in phantom in FIGS. 2 and 4.

Figure 7:
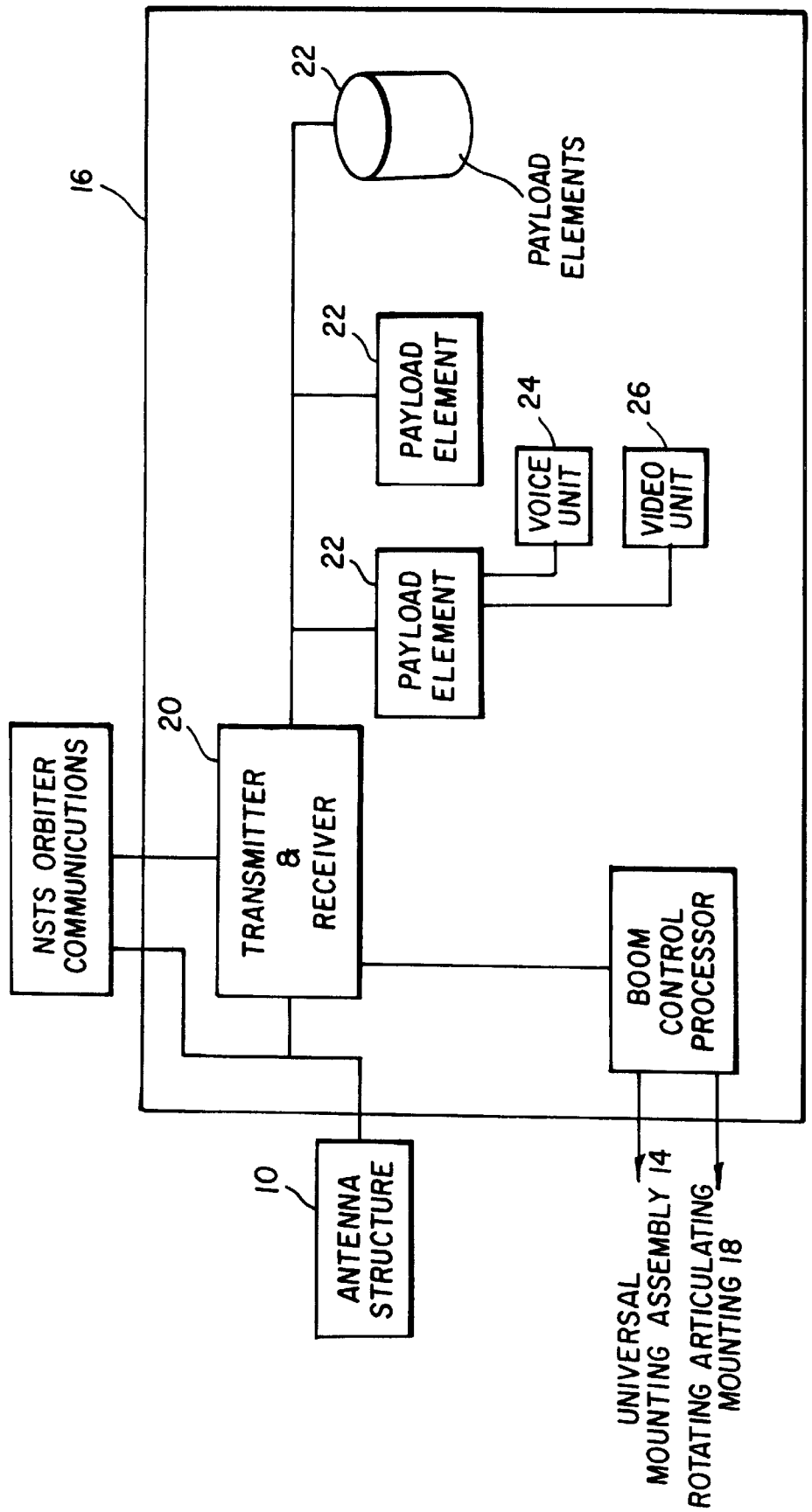
FIG. 7 is a schematic block diagram view of the coupling of the antenna structure to various elements within the payload module.

FIG. 7 illustrates the connection of the antenna structure 10 to various experiments and devices within the payload module 16. As shown in FIG. 7, the antenna structure 10 is coupled to a transmitter/receiver unit 20, which in turn has data lines coupled to various payload elements 22. The payload elements 22 may include individual customer experiments, thereby permitting customers to directly communicate with their experiments, monitoring systems for the payload module 16, thereby permitting the module operator to directly monitor module function, or any other types of payloads requiring communication capability. In addition, a voice unit 24 and a video unit 26 are preferably provided to permit direct audio and video links with mission specialists working within the payload module 16. Signals from the transmitter/receiver unit 20 may also be supplied to a boom control processor 28, which monitors various signal characteristics of transmitted and received signals. Based on the monitored signal characteristics, the boom control processor 28 sends signals to the motors of the universal mounting assembly 14 and the rotating articulating mounting 18 to properly position the antenna structure 10 for optimum results. Finally, a signal line from the NSTS Orbiter's communication system can be coupled to the transmitter/receiver unit 20 or directly to the antenna structure 10 to permit the communication system to provide supplemental and independent communications capacity to the NSTS Orbiter.

The invention has been described with reference to certain preferred embodiments thereof. It will be understood, however, that modifications and variations are possible within the scope of the appended claims.

What is claimed is:

1. A universal communication system comprising:

an antenna structure mounted to a first end of a boom structure via a rotating and articulating mounting;

a universal mounting assembly coupled to a second end of the boom and to a payload module, wherein the universal mounting permits rotation and articulation of the boom structure; and means for automatically disconnecting the boom structure from the universal mounting assembly in response to an emergency situation in which the boom structure cannot be properly stowed.

2. A universal communication system as claimed in claim 1, further comprising means for providing dedicated communication between payload elements located within the payload module and at least one of a ground station and an orbiting station via the antenna structure.

3. A universal communication system as claimed in claim 1, wherein the payload module is located within a cargo bay of a space transportation vehicle and wherein the universal communication system further comprises means for coupling an internal communication system of the space transportation vehicle to the antenna structure.

\* \* \* \* \*